UNITED STATES PATENT OFFICE.

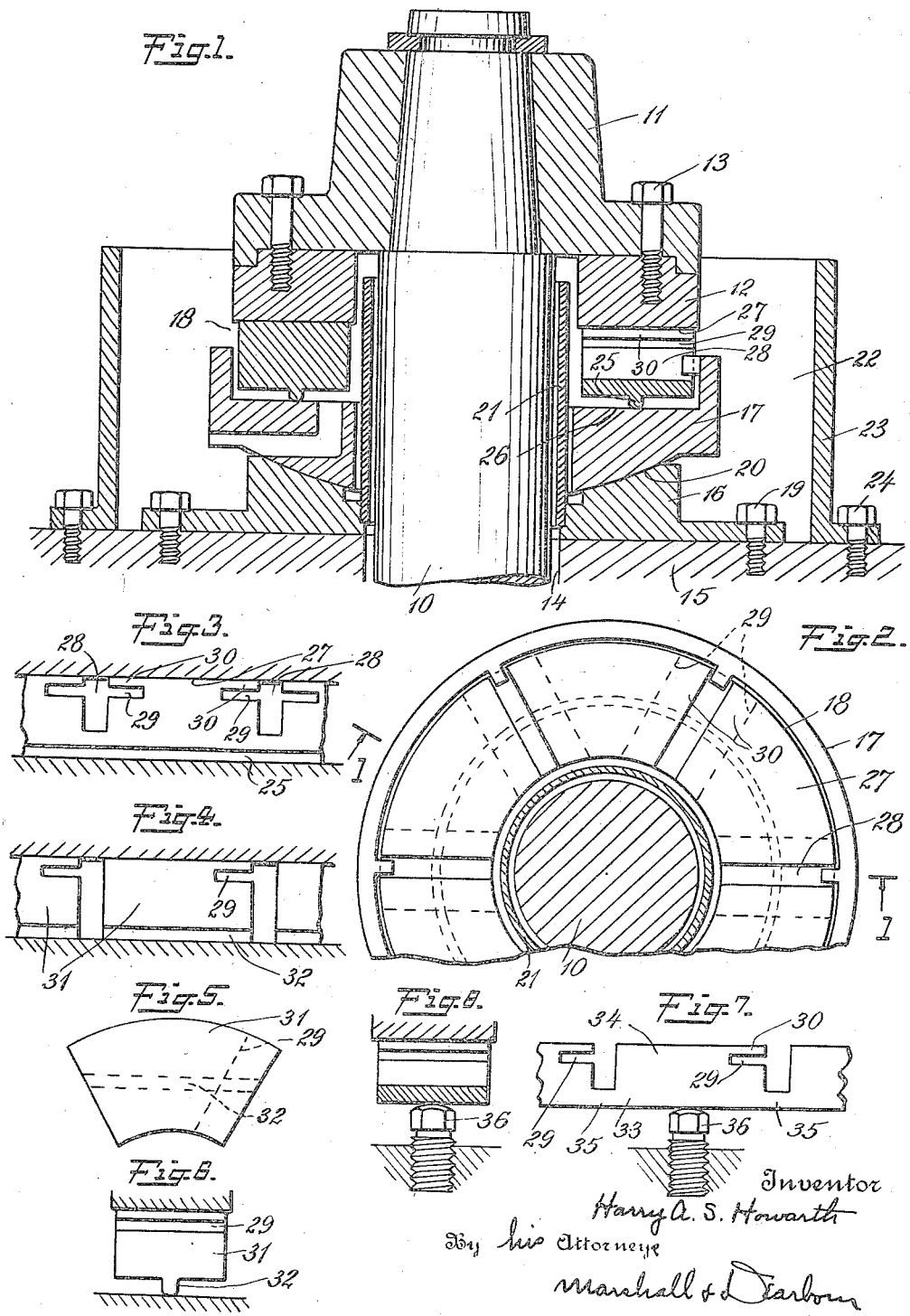

HARRY A. S. HOWARTH, OF PITTSBURGH, PENNSYLVANIA, ASSIGNOR TO ALBERT KINGSBURY, OF PITTSBURGH, PENNSYLVANIA.

BEARING.

1,390,131.  Specification of Letters Patent.  Patented Sept. 6, 1921.

Application filed November 14, 1917. Serial No. 201,915.

*To all whom it may concern:*

Be it known that I, HARRY A. S. HOWARTH, a citizen of the United States of America, and a resident of Pittsburgh, Allegheny county, and State of Pennsylvania, have invented certain new and useful Improvements in Bearings, of which the following is a specification, reference being had to the accompanying drawings, forming a part thereof.

My invention relates to bearings and has special reference to collar bearings and shoe bearings wherein provision is made for the automatic lubrication of the bearing surfaces by other than the tilting of the bearing sectors or shoes circumferentially of the axis of the bearing. One object of my invention is to provide an improved bearing member so constructed as to provide simple and effective means for establishing automatic lubrication between the bearing surfaces.

Thrust collars having radial oil grooves dividing the bearing surface into sectors are well known but lubrication is not automatically maintained between the bearing surfaces, particularly under high thrust pressures, unless some means is provided for starting the oil between the bearing surfaces. If the oil be suitably introduced at the leading edges of the bearing sectors, however it will be wedged between the bearing surfaces and a lubricating film will be maintained.

According to my present invention I provide a yielding portion at the leading end of each sector or shoe. While such yielding portion may be provided in any suitable way, I preferably undercut the leading edge of the sector or shoe so as to leave a projecting portion sufficiently flexible to bend and form a suitable wedge-shaped opening into which the oil will be forced by the relative rotary movement of the bearing surfaces.

The invention is capable of receiving a variety of mechanical expressions, some of which are shown on the accompanying drawings, but it is to be expressly understood that the drawings are for purposes of illustration only and are not to be construed as a definition of the limits of the invention, reference being had to the appended claims for that purpose.

Referring to the drawings:

Figure 1 is a sectional elevation of a thrust bearing arranged and constructed in accordance with my invention, and constituting an embodiment thereof, the section being taken on the line 1—1 of Fig. 2.

Fig. 2 is a partially sectional plan view of the bearing shown in Fig. 1.

Fig. 3 is a sectional detail of the bearing member.

Fig. 4 is a view corresponding to Fig. 3, showing a modified structure which embodies my invention.

Fig. 5 is a plan view of one of the bearing shoes shown in Fig. 4.

Fig. 6 is a transverse section showing one of the shoes in end elevation.

Another embodiment of my invention is shown in Figs. 7 and 8.

In the form shown in Figs. 1, 2 and 3,— 10 designates a rotatable shaft to which a thrust block 11 is affixed. A thrust collar 12 is suitably secured to the thrust block as by bolts 13. The shaft extends through a hole 14 in a foundation or bed plate 15 and through a base ring 16, a leveling washer 17, and an annular bearing member 18 which coöperates with the thrust collar.

The base ring is suitably affixed to the foundation as by bolts 19 and in the form shown has a spherically curved supporting surface 20 on which the leveling washer 17 is mounted, said washer constituting an equalizing support for the bearing member 18 whereby the load or pressure is uniformly or equitably distributed among the several bearing sectors or shoes. A sleeve 21 is secured to the base ring and loosely surrounds the shaft, forming the inner wall of an annular oil chamber 22 which is completed by an outer wall or flange 23 suitably secured to the bed plate 15 as by bolts 24.

The bearing member 18 in this embodiment is ring-shaped and has a substantially central longitudinally extending annular projection or bead 25 constituting a knife edge or rocking support which rests upon the upper surface 26 of the leveling washer 17. Its bearing surface 27 is divided into sectors by a plurality of transverse, shown as substantially radial, grooves or slots 28 of sufficient depth to provide flexible connecting portions between said sectors, and the advancing edge of each sector is undercut as shown at 29 so as to render said edge yielding, thereby providing a projecting portion 30 which is sufficiently flexible to bend under the action of the oil and form a wedge-shaped opening into which the oil is forced by the relative rotation of the parts. If the bearing is designed to rotate in either direction, both edges of each sector will be undercut as shown.

In place of connected sectors the bearing member 18 may be composed of separate sectors or shoes 31 as shown in Figs. 4 to 6. In the form here shown only one edge of each sector or shoe is undercut, as is proper, if the bearing is to operate only in one direction, as it is only necessary to provide for the entrance of the oil at the leading edge of the shoe or sector.

Each of the shoes 31 is shown as supported on a chordal rib constituting a longitudinally-extending knife edge or rocking projection 32.

The longitudinally-extending knife-edge or rocking bearing for the bearing member 18 need not be continuous nor a part of said bearing member, but may be interrupted or formed as a projection of the leveling ring 17.

In Figs. 7 and 8 I have shown an annular bearing member 33 having sectors 34, said bearing member having a rocking support provided by a plurality of screws or studs 36 mounted on the leveling ring 17 and having rounded or curved heads engaging the member 33. The sectors 34 are rigid except for the portions 30 provided by the slots or undercuts 29, and are connected by resilient portions 35 which permit the sectors to tilt on said screws or studs 36. In this arrangement the automatic lubrication is effected both by the tilting of the sectors and by the yielding of the portions 30.

The longitudinally-extending rib supports 25 and 32 prevent bodily tilting of the sectors or shoes in response to the wedging action of the lubricating fluid, i. e. circumferentially of the axis of the bearing, but permit tilting of said sectors or shoes radially of the axis of the bearing. While said longitudinally-extending supports 25 and 32 have been referred to as "knife-edge" projections or supports, they need not have true knife edges, but may be rounded or curved as shown, or have any other suitable construction to provide for the proper tilting of the sectors or shoes of which the bearing member 18 is composed. The terms "knife-edge" and "rib" are therefore to be construed as generic to any suitable support, whether continuous or interrupted, which provides an elongated rocking support for the bearing member or its constituent parts.

While the embodiments shown on the drawings have been described with considerable particularity, it is to be understood that the invention is not limited thereto as the same is capable of receiving a variety of mechanical expressions, some of which will readily suggest themselves to those skilled in the art, while certain features are capable of use without other features thereof. Reference is therefore to be had to the appended claims for a definition of the limits of the invention.

What I claim is:

1. A thrust bearing member having a thrust surface and a yielding portion adapted to establish an oil film on the thrust surface, and means for supporting said member to prevent tilting thereof circumferentially of the axis of the bearing.

2. A thrust bearing member having a thrust surface and a yielding portion at one end adapted to establish an oil film on the thrust surface, and means extending longitudinally of said member for supporting the same so as to permit said members to tilt only radially of the axis of the bearing.

3. A thrust bearing member comprising a plurality of parts forming a segmental ring bearing surface, each of said parts having a yielding portion at one end, and means for supporting said segmental ring so as to permit tilting of the parts only radially of the axis of the bearing.

4. A thrust bearing member comprising a plurality of parts forming a segmental ring bearing surface, and a medial annular support for said parts, said parts having yielding portions at their leading ends to establish an oil film on the bearing surface.

5. A thrust bearing member having a thrust surface, and an undercut portion at the leading end thereof, and a longitudinally extending rib support for permitting tilting of said member only radially of the axis of the bearing.

6. A thrust bearing member having transverse openings dividing the member into a series of flexibly connected sectors, each of which is provided with a yielding portion at its leading edge.

7. A thrust bearing member comprising a series of sectors flexibly united to each other at their adjacent ends and having flexible portions at their leading edges.

8. A thrust bearing member provided with a longitudinally extending knife edge support and an undercut recess at one end adjacent to the bearing surface whereby to establish automatic lubrication of said bearing surface.

9. A thrust bearing comprising an annular bearing member consisting of a plurality of sectors connected by flexible webs and provided with transverse openings extending under the leading edges of said sectors, and means for supporting said annular bearing member so as to permit of the individual tilting of said sectors radially of the axis of the bearing.

10. The combination of a bearing member comprising a plurality of sectors having flexible portions at their leading edges, and means to equalize the pressure on said sectors and thereby effect uniform lubrication.

11. The combination of a bearing member comprising a plurality of bearing sectors tiltably mounted on longitudinally-extending supporting means and provided with flexible portions at their leading edges, and an equalizing means for supporting said bearing member and uniformly distributing the pressure or load thereon.

12. The combination of a bearing member comprising a plurality of bearing sectors tiltably mounted on longitudinally-extending supporting means and provided with flexible portions at their leading edges, and a ball and socket support for said bearing member adapted to automatically equalize the thrust pressures thereon.

13. A thrust bearing member having transverse openings dividing the member into a series of sectors each of which is provided with a yielding portion at its leading edge.

14. A thrust bearing member having transverse openings dividing the member into a series of sectors each of which is provided with a yielding portion at its leading edge, and longitudinally-extending supporting means for said sectors permitting tilting thereof only radially of the axis of the bearing.

15. A thrust bearing member having transverse openings dividing the member into a series of sectors connected to each other at adjacent ends and provided with yielding portions at their leading edges.

16. A thrust bearing comprising relatively movable members having opposed bearing surfaces, one of said members comprising a plurality of sectors each provided with a yielding portion to automatically wedge the lubricating fluid between said bearing surfaces when the bearing is in operation, and longitudinally-extending rib-supporting means for said bearing sectors.

17. A thrust bearing comprising a sector provided with a flexible projection at its leading edge and supported to tilt only radially of the axis of the bearing.

18. A thrust bearing comprising a plurality of connected sectors provided with flexible projections at their leading edges.

19. A thrust bearing comprising a plurality of connected sectors provided with flexible projections at their leading edges, and a longitudinally-extending support for said sectors to permit tilting thereof.

20. A thrust bearing comprising a plurality of connected sectors provided with flexible projections at their leading edges, and means supporting said sectors to permit tilting thereof only radially of the axis of the bearing.

21. A thrust bearing comprising a plurality of flexibly connected sectors provided with flexible projections at their leading edges.

22. A thrust bearing comprising a plurality of flexibly connected sectors provided with flexible projections at their leading edges and a longitudinally-extending support for said sectors to permit tilting thereof.

23. A thrust bearing member having transverse openings dividing the member into a series of sectors connected to each other at adjacent ends and provided with yielding portions at their leading edges, and longitudinally-extending supporting means for said sectors permitting tilting thereof only radially of the axis of the bearing.

24. A thrust bearing member having transverse openings dividing the member into a series of flexibly connected sectors each of which is provided with a yielding portion at its leading edge, and longitudinally-extending supporting means for said sectors permitting tilting thereof radially of the axis of the bearing.

25. A thrust bearing comprising an annular bearing member consisting of a plurality of sectors connected by flexible webs and provided with transverse openings extending under the leading edges of said sectors.

26. A bearing comprising relatively movable bearing members including one or more sectors provided with yielding portions at their leading edges, and means for supporting said sectors to permit the same to tilt only in a direction transverse to the direction of relative movement of said bearing members.

27. A bearing comprising one or more sectors provided with yielding portions at their leading and trailing edges, and means for supporting said sectors to permit tilting of the same only radially of the axis of the bearing.

28. A bearing comprising a plurality of flexibly connected sectors provided with yielding portions at their leading edges, and means for supporting said sectors to prevent tilting thereof circumferentially of the axis of the bearing.

29. A bearing comprising one or more sectors provided with a yielding portion at their leading edges, and means for supporting said segments to prevent bodily tilting of the same in response to the wedging action of the lubricating fluid.

In witness whereof, I have hereunto set my hand this 12th day of November, 1917.

HARRY A. S. HOWARTH.